3,395,132
METHOD FOR CROSSLINKING POLYPHENYLENE SULFIDE RESINS
Harry A. Smith, Midland, Mich., assignor to The Dow Chemical Company, Midland, Mich., a corporation of Delaware
No Drawing. Filed Jan. 23, 1967, Ser. No. 610,793
7 Claims. (Cl. 260—79.5)

ABSTRACT OF THE DISCLOSURE

The present invention concerns the method for crosslinking polyphenylene sulfide resins by heating the resin with an aromatic compound having a boiling point between 250° C. and 350° C. These so-treated resins can be employed to laminate ceramic and metal materials.

Field of invention

The polyphenylene sulfide resins have been disclosed in U.S. Patents Nos. 2,513,188, 2,538,941, and 3,291,779. The so-produced materials are not readily usable as laminating adhesives because of their highly viscous state.

Brief description of invention

It has now been found that substantially linear polyphenylene sufide resins can be crosslinked by merely heating the resin with from 1 to 90 percent by weight, based on the resin, of an aromatic compound having a boiling point between 250° and 350° C. at between 250° C. and the boiling point of the aromatic compound under atmospheric or superatmospheric pressure but not exceeding 350° C. The so-crosslinked polymer is a stable resinous material having a softening point between 300° and 400° C. and a thermal flexure failure in laminates between 400° and 600° C.

Detailed description of invention

The present invention provides a method for crosslinking substantially linear polyphenylene sulfide resins, both non-halogenated and halogenated, e.g. containing up to 1 bromine or chlorine atom per 4 phenylene groups. The resins prepared in accordance with the present invention are thermally stable up to about 600° C. before the resin degrades sufficiently to fail. These novel resins are prepared using a 2 step curing process. The 2 step process involves as a first step the heating of the linear resin and from 1 to 90 percent by weight based on the resin of an aromatic compound at between about 250° to 350° C. for from about 15 minutes to about 48 hours. Preferably the heating is conducted at between 300° and 350° C. for from 15 minutes to about 6 hours. The resin-aromatic compound may be prereacted, as indicated, and while still in a fluid state employed to impregnate or coat ceramic or metal laminae or the unreacted mixture of resin and aromatic may be used to impregnate or coat the laminate then prereacted above 250° C. In either event, after prereaction, the laminate is pressed or molded at about 350° C. for 2 to 20 minutes under pressure. Subsequent to molding, the laminar structure should be postcured at 300° to 350° C. for 5 minutes up to 6 hours, although preferably 15 minutes to 2 hours postcure at 350° C. is sufficient.

The polyphenylene sulfide resins which can be employed in accordance with the present invention are those having the following general formula $$(C_6H_{4-a}SX_a)_y$$

wherein X represents a middle halogen and y represents at least 4 and any integer greater than 4 to provide a molecular weight up to about 40,000 and $a$ represents an integer having an average value of from 0 to 0.25. Resins suitable for use in accordance with the present invention are described in U.S. Patents Nos. 2,513,188, 2,538,941, 3,291,779 and copending application Ser. No. 455,644, entitled "Method for Preparing Linear Polyarylene Sulfide," filed May 10, 1965, by R. W. Lenz, C. E. Handlovits and W. K. Carrington.

Suitable aromatic compounds, which may be halogenated, and which boil between 250° and 375° C., are biphenyl, chlorobiphenyl, bromobiphenyl, dichlorobiphenyl, trichlorobiphenyl, tetrachlorobiphenyl, dibromobiphenyl, tribromobiphenyl, tetrabromobiphenyl, and the like.

It is to be further understood that various inorganic alkali metal or alkaline earth metal sulfides or oxides can be added to the resin-aromatic mixture and there will be obtained a further increase in thermal stability of the resin in laminar structures without materially affecting the applicability of the resin to the laminating technique.

The following examples illustrate the present invention but are not to be construed as limiting:

Example 1

A solution of 32.5 gms. of phenylene sulfide polymer containing one bromine atom per 4 repeating units (prepared by reacting polyphenylene sulfide slurried in methylene chloride with bromine at room temperature until a titration indicated the desired amount of bromine had been introduced into the polymer) and 7.0 gms. of K$_2$S (finely ground) was made up in 171 gms. of the product sold under the tradename Aroclor 1221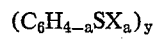, a monochlorinated biphenyl having a boiling point of 275° to 300° C. (Monsanto Chemical Company) at 200° C. Several 2½ x 6 inch pieces of glass cloth (J. P. Stevens Company) were impregnated by immersing the cloth in the hot solution. The impregnated samples were then placed in an oven for 6 hours at 300° C. to evaporate off the excess solvent. The dried samples were then made into a laminate (12 layers) and pressed at 300° C. and 100 p.s.i. for 96 hours. Resin content of the cured laminate (Sample No. 1) was 16.3% .

Another laminate (Sample No. 2) was prepared using the same cloth, cure schedule, polymer and proportions but using only the K$_2$S as a crosslinking agent. The polymer and crosslinker were dusted on the cloth prior to molding.

These two samples were suspended on a heating bar such that their centers, which were in contact with the bar, supported the entire weight of the samples and that of two 50 gm. weights on the ends of the samples. The heating bar was turned on. Sample No. 2 failed thermoplastically at 300° to 350° C. At this temperature, Sample No. 1, made by the present invention, showed no effect. Slight evidence of resin degradation was noted from 350° to 600° C. Sample No. 1 finally failed 1.5 hours after the temperature had reached 600° C. Failure was due to degradative resin losses and not to thermoplastic failure.

Example 2

A mixture of a 30,000 molecular weight non-halogenated phenyl sulfide polymer, 92.2% by weight and monochlorobiphenyl, 7.8% by weight, was made up and mixed by rolling to give a light powdery mixture. This was heated for 5½ hours at 300° C. and then molded at 350° C. for 10 minutes at 110 p.s.i. On thermal flexural analysis (TFA) no failure occurred up to 550° C.

Example 3

This was repeated using tetrachlorobiphenyl and a variety of precure times at 300° C. and postcure times at 350° C. with the results indicated below:

TFA RESULTS

| Precure Time, hrs. | Postcure Time | |
|---|---|---|
| | 6 hrs. | 20 hrs. |
| | TFA failure temp., ° C. | |
| 1 | 245 | 305 |
| 2 | 235 | 345 |
| 4 | 250 | 355 |
| 6 | 230 | 345 |

Example 4

Using the same resin as in Example 2, tetrachlorobiphenyl in place of monochloro biphenyl, a variety of precure times at 300° C., postcure times at 350° C., and molded at 350° C. for ten minutes at 110 p.s.i., the results below were obtained:

TFA RESULTS

| Precure Time, min. | Postcure Time | | |
|---|---|---|---|
| | 6 hrs. | 20 hrs | 72 hrs. |
| | TFA failure temp., ° C. | | |
| None | Too fluid to mold at 350° C. | | |
| 5 | 245 | 300 | 315 |
| 15 | 255 | 305 | 380 |
| 30 | 245 | 290 | 325 |
| 45 | 245 | 300 | 360 |
| 60 | 215 | | (¹) |
| 120 | 240 | | |
| Control (no precure nor tetrachlorobiphenyl) | 120 | 170 | 225 |

¹ Not tested.

Example 5

A 5,000 molecular weight nonhalogenated phenylene sulfide polymer and chlorinated or unsubstituted biphenyl was mixed as in the previous case. Precure again was at 300° C., followed by molding at 350° C. for 10 minutes at 110 p.s.i. The molded samples were then postcured at 350° C.

TFA RESULTS

| Crosslinker | Precure Time, hrs. | Postcure Time | | |
|---|---|---|---|---|
| | | 6 hrs. | 20 hrs. | 72 hrs. |
| | | TFA Failure Temp., °C. | | |
| None | 1 | 280 | 305 | (¹) |
| | 2 | 260 | 300 | (¹) |
| | 4 | 205 | 330 | (¹) |
| | 6 | 185 | 320 | (¹) |
| Monochlorobiphenyl | 2 | 275 | 275 | 355 |
| | 4 | 260 | 295 | 360 |
| | 6 | 255 | 310 | 340 |
| | 8 | 270 | 300 | 280 |
| Biphenyl | 1 | 245 | 305 | (²) |
| | 2 | 235 | 345 | |
| | 4 | 250 | 355 | |
| | 6 | 230 | 345 | |

¹ Too weak.   ² Not tested.

Example 6

A mixture of chlorinated polyphenylene sulfide and monochlorobiphenyl was made up as in previous samples and precured. After precuring, the sample was ground and then mixed with enough CaS to give a 100 percent excess CaS over that to react with the chlorine in the polymer. This mixture was then molded under the usual conditions and postcured.

TFA RESULTS

| Precure Time, hrs. | Postcure Time | | |
|---|---|---|---|
| | 6 hrs. | 20 hrs. | 72 hrs. |
| | TFA Failure Temp., ° C. | | |
| 2 | 410 | 40 | 400 |
| 4 | 440 | 385 | (¹) |
| 6 | (¹) | | (²) |

¹ Too weak.   ² Not tested.

Example 7

The procedure of Example 5 was used with a brominated polyphenylene sulfide having about 1 bromine/7 repeating units and in the cases where inorganic crosslinkers were added, the procedure used with the chlorinated polymer in Example 6 was followed.

TFA RESULTS

| Crosslinker | Precure Time, hrs. | Postcure Time | | |
|---|---|---|---|---|
| | | 6 hrs. | 20 hrs. | 72 hrs. |
| | | TFA Failure Temp., ° C. | | |
| None | 1 | 275 | 295 | (¹) |
| | 2 | 280 | 265 | |
| | 4 | 255 | (²) | |
| | 6 | 265 | (²) | |
| Biphenyl (8% by weight) | 1 | 295 | 325 | |
| | 2 | 305 | 305 | 370 |
| | 4 | 275 | 310 | |
| | 6 | 375 | (²) | |
| Biphenyl (8% by weight) +CaS (1 CaS per halogen). | 1 | 250 | 370 | |
| | 2 | 265 | 370 | |
| | 4 | 280 | 305 | 405 |
| | 6 | 285 | 315 | 430 |
| Monochlorobiphenyl (8% by weight)+CaS. | 2 | 475 | | |
| | 4 | 420 | | |
| | 6 | (²) | | |
| Tetrachlorobiphenyl | ½ | 310 | 325 | 375 |
| | 1 | 280 | 315 | 360 |
| | 2 | 285 | 300 | 365 |
| | 4 | 275 | 305 | 330 |
| Tetrachlorobiphenyl+CaS | ½ | 285 | 320 | 440 |
| | 1 | 285 | 310 | 400 |
| | 2 | 290 | 305 | |
| | 4 | 280 | 300 | 415 |
| Tetrachlorobiphenyl+CaS (2CaS per halogen). | ½ | 275 | 295 | 380 |
| | 1 | 285 | 290 | 400 |
| | 2 | 280 | 280 | 425 |
| | 4 | 280 | 305 | 430 |
| Tetrachlorobiphenyl+CaO ³ | 1 | | 395 | (²) |
| Tetrachlorobiphenyl+CaS ³ | 1 | | >550 | 530 |
| Tetrachlorobiphenyl ³ | 1 | | 390 | (²) |

¹ Not tested.
² Too weak.
³ Polymer in these examples had an average bromine content of about 1 bromine atom per 5 phenylene sulfide groups.

I claim:

1. A method for crosslinking substantially linear polyphenylene sulfide resins which comprises the steps of:
   (1) heating the said resin with from 1 to 90% by weight, based on the weight of the resin, of an aromatic compound having a boiling point between 250° and 350° C., and selected from the group consisting of biphenyl and its mono, di, tri and tetra chlorinated and brominated derivatives, for from 15 minutes to about 48 hours at a temperature of from between 250° C. and the boiling point of said aromatic compound,
   (2) forming the material into its final shape while in said fluid state;
   (3) heating the so-shaped material at about 300° to 350° C. for from 2 to 20 minutes under a pressure greater than atmospheric; and
   (4) postcuring the so-shaped material at from 300° to 350° C. for from 5 minutes to 6 hours.

2. The method of claim 1 wherein said aromatic compound is biphenyl.

3. The method of claim 1 wherein said aromatic compound is halobiphenyl.

4. The method of claim 1 wherein said aromatic compound is monochlorobiphenyl.

5. The method of claim 1 wherein said aromatic compound is tetrachlorobiphenyl.

6. The method of claim 1 wherein said resin is a halogenated resin and is mixed prior to shaping in step 2 with an alkali metal or alkaline earth metal sulfide or oxide in an amount to provide from ½ mole to about 2 moles of sulfide or oxide per atom of halogen.

7. The method of claim 6 wherein said resin is $$(C_6H_{4-a}SX_a)_y$$

wherein $a$ represents an integer having an average value of 0 to 0.25, $y$ represents an integer greater than 4, and X represents bromine or chlorine.

References Cited

UNITED STATES PATENTS

| | | | |
|---|---|---|---|
| 2,513,188 | 6/1950 | MacAllum | 260—79 |
| 2,538,941 | 1/1951 | MacAllum | 260—79.1 |
| 3,282,902 | 11/1966 | Panek | 260—79 |
| 3,291,779 | 12/1966 | Handlovits et al. | 260—79 |
| 3,324,087 | 6/1967 | Smith et al. | 260—79.3 |

JOSEPH L. SCHOFER, *Primary Examiner.*

D. K. DENENBERG, *Assistant Examiner.*